United States Patent
Shif et al.

(10) Patent No.: US 10,659,289 B2
(45) Date of Patent: May 19, 2020

(54) SYSTEM AND METHOD FOR EVENT PROCESSING ORDER GUARANTEE

(71) Applicant: ServiceNow, Inc., Santa Clara, CA (US)

(72) Inventors: Vadim Shif, Tel Aviv (IL); Ofer Gati, Tel Aviv (IL); Dov Miron, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 142 days.

(21) Appl. No.: 15/933,115

(22) Filed: Mar. 22, 2018

(65) Prior Publication Data

US 2019/0296960 A1    Sep. 26, 2019

(51) Int. Cl.
| | |
|---|---|
| *G06F 15/16* | (2006.01) |
| *H04L 12/24* | (2006.01) |
| *H04L 12/26* | (2006.01) |
| *H04L 29/08* | (2006.01) |
| *H04L 9/08* | (2006.01) |

(52) U.S. Cl.
CPC ............ *H04L 41/06* (2013.01); *H04L 41/046* (2013.01); *H04L 43/0817* (2013.01); *H04L 43/0823* (2013.01); *H04L 67/1002* (2013.01); *H04L 9/0861* (2013.01)

(58) Field of Classification Search
CPC ... H04L 41/06; H04L 41/046; H04L 43/0823; H04L 67/1002
See application file for complete search history.

(56) References Cited

U.S. PATENT DOCUMENTS

| | | | |
|---|---|---|---|
| 9,400,607 B1* | 7/2016 | Daud | H04L 67/1097 |
| 9,535,862 B2 | 1/2017 | Falco et al. | |
| 10,187,251 B1* | 1/2019 | Kothandaraman | H04L 67/22 |
| 10,331,693 B1* | 6/2019 | Kothandaraman | G06F 16/24568 |
| 10,469,396 B2* | 11/2019 | Mellor | G06Q 10/10 |
| 10,516,565 B2* | 12/2019 | Makovsky | H04L 41/0663 |
| 2005/0144269 A1* | 6/2005 | Banatwala | G06F 9/542 709/223 |
| 2005/0273788 A1* | 12/2005 | Gupta | G06F 9/542 719/310 |
| 2005/0278354 A1* | 12/2005 | Gupta | G06F 9/4488 |
| 2014/0188970 A1* | 7/2014 | Madhok | H04L 67/04 709/201 |
| 2014/0189888 A1* | 7/2014 | Madhok | H04L 63/0807 726/29 |

(Continued)

*Primary Examiner* — Douglas B Blair
(74) *Attorney, Agent, or Firm* — Fletcher Yoder PC (57) ABSTRACT

The present approach relates to the use of a unique key for event messages related to the same event and by employing a publication/subscription framework so that like-keyed event messages are only processed by a subscribing server. The message key may be a numeric value (e.g., from 0-99) calculated or generated based on designated event fields so that similar message keys will have the same message key number. The message key may be used to populate an event bucket field and may also be used as the topic of an event message, allowing a subscribing server to subscribe to this message key and receive and process the related event messages in order of arrival. In this manner, there is no distribution of the event messages having the same message key between parallel processing servers.

20 Claims, 4 Drawing Sheets

(56) References Cited

U.S. PATENT DOCUMENTS

| | | | |
|---|---|---|---|
| 2016/0105370 A1* | 4/2016 | Mellor | G06Q 10/00 |
| | | | 709/226 |
| 2016/0357778 A1 | 12/2016 | MacKenzie et al. | |
| 2018/0083992 A1* | 3/2018 | Bose | H04L 63/1425 |
| 2018/0084073 A1* | 3/2018 | Walsh | H04L 67/2819 |
| 2018/0167275 A1* | 6/2018 | Kovacheva | H04L 41/0816 |
| 2018/0196878 A1* | 7/2018 | Iball | G06F 16/22 |
| 2018/0302266 A1* | 10/2018 | Makovsky | H04L 41/046 |
| 2018/0321927 A1* | 11/2018 | Borthakur | G06F 8/61 |
| 2018/0324204 A1* | 11/2018 | McClory | H04L 41/5041 |
| 2019/0266276 A1* | 8/2019 | Patel | G06F 16/2365 |

* cited by examiner

```
POST  http://localhost:8057 /api/mid/em /inbound_event?Transform=...  PARAMS  SEND  SAVE
4 -  [
5 -    {
6      "source" : "EventOnMID",
7      "node" : " ",
8      "type" : "High Virtual Memory",
9      "resource" : "memory",
10     "severity" : "5",
11     "classification" : "0",
12     "description" "Virtual memory usage on OWA-SD-01 exceeds 96%",
13     "ci_type" : "cmbd_ci app_server_tomcat",
14     "additional info" : "{name: My Airlttines}"
15   }
16
17  ]
18 }
```

FIG. 6

SYSTEM AND METHOD FOR EVENT PROCESSING ORDER GUARANTEE

BACKGROUND

The present disclosure relates in general processing of system or event messages in an order in which they are generated.

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data related to a variety of measurable properties, including network, hardware, or database performance properties measured at different times and may be monitored to properly maintain network infrastructure. As networks become more complex, network monitoring, maintenance and management becomes more difficult to properly maintain. For example, in the context of a distributed computing environment, a system or resource that is not operating properly may generate messages or indications to that effect. Due to the distributed nature of the computing environment, however, such messages may be received and processed by different monitoring devices at different times, or even out of chronological order.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information at various time intervals. Monitoring this data may help gain insight into events occurring in the monitored components. By way of example, such incidents may encompass failures or sub-optimal performance at a device or system level, communication or network level, and/or application or database level. By monitoring and managing such events, alert correlation and root cause analysis for services and alert groups may be performed. However, as events are received over time for analysis, it is increasingly difficult, particularly in a distributed context, to manage the event messages efficiently and in the order in which they are generated.

With this in mind, an event management system as described herein may balance processing of events and event message for further analysis between multiple servers such that messages corresponding to a given event are processed by a single server. Additionally, the servers may be configured to process events in the same order that they are generated by the respective monitored resource. Thus, the order of event messages is preserved as a respective event is processed on the designated server.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in a world in which various electronics devices are interconnected within a distributed context. As more functions are performed by services using some form of distributed computing, the complexity of IT network management increases. As the complexity of IT network increases, events (e.g., incidents) occurring on the devices may increase, making managing or resolving the events more difficult.

In such an interconnected but distributed context, the configuration of each of these devices may be represented by one or more configuration items (CIs) that detail certain configurations, parameters, components, software, or settings associated with a respective device. CIs may include information related to a physical entity (e.g., hardware), a logical entity (e.g., version, instance of a database), a conceptual entity (e.g., service), and the like associated with a respective device. A configuration management database (CMDB) stores and tracks the discovered CIs connected to the network. Such information stored on the CMDB may then be used by other applications and/or by IT personnel in managing or using the resources on the network.

In view of recurring or constant processes that generate operational or procedural data, IT networks may include server systems that acquire and report data (e.g., events that may indicate incidents) related to a number of measurable properties in order to be processed for analysis and then used for IT management.

For example, for a given computer system, data regarding performance of computer resources (e.g., central processing unit, disk, memory transaction count) and various CIs, may indicate an event (e.g., incident) related to a current or imminent service issue. Such an event may relate to failure or poor performance of a hardware, software, or network aspect of a monitored system or network. Messages related to the event may be sent through an event management process, as discussed herein, to be managed and/or analyzed.

The current architecture for event management includes a server connector instance sending events to a managing instance, where the event management process generates alerts, applies alert rules, and prioritizes alerts for remediation and root cause analysis. An event or event message in the event management system, as used herein, is a notification from a monitoring tool (e.g., event management listener) that indicates something of interest has occurred, such as a log message, warning, or error. The process flow of the event management system includes events from external event resources (e.g. CIs) that are either pushed into or pulled from the server connector. For events that meet defined criteria specified in defined alert rules, alerts may be created or updated. The analysis and alerts can be viewed and managed by a user via dashboards, an alert console, or a service map and/or may trigger automated responses at the system level.

As the number of events received by a server increase, it becomes increasingly difficult to process incoming events to analyze a particular incident. Accordingly, it may be desirable to have multiple servers receive data (e.g., events indicating incidents) to avoid a bottleneck of events to be processed for analysis. However, given the number of events from various resources, processing events from the same resource may be received by different servers and/or processed out of order for the same resource (e.g., one server processing a later occurring event message from a resource faster than another server processing an earlier event message sent from the resource). Thus, processing of events on multiple servers may lead to errors in analysis due to mis-ordered processing of event messages, and may further lead to unnecessary or incorrect remedial operations performed for IT management.

The present approach addresses such problems by employing a unique key for those event messages related to the same event and by employing a publication/subscription framework so that like-keyed event messages are only processed by a subscribing server. For example, the message key may be a numeric value (e.g., from 0-99) calculated or generated based on designated event fields (e.g., node, resource, source, type, metric name, and so forth) so that similar message keys will have the same message key number. The message key may be used to populate an event bucket field and may also be used as the topic of an event message, allowing a subscribing server to subscribe to this message key and receive and process the related event messages in order of arrival. In this manner, there is no distribution of the event messages having the same message key between parallel processing servers.

Figure 1:
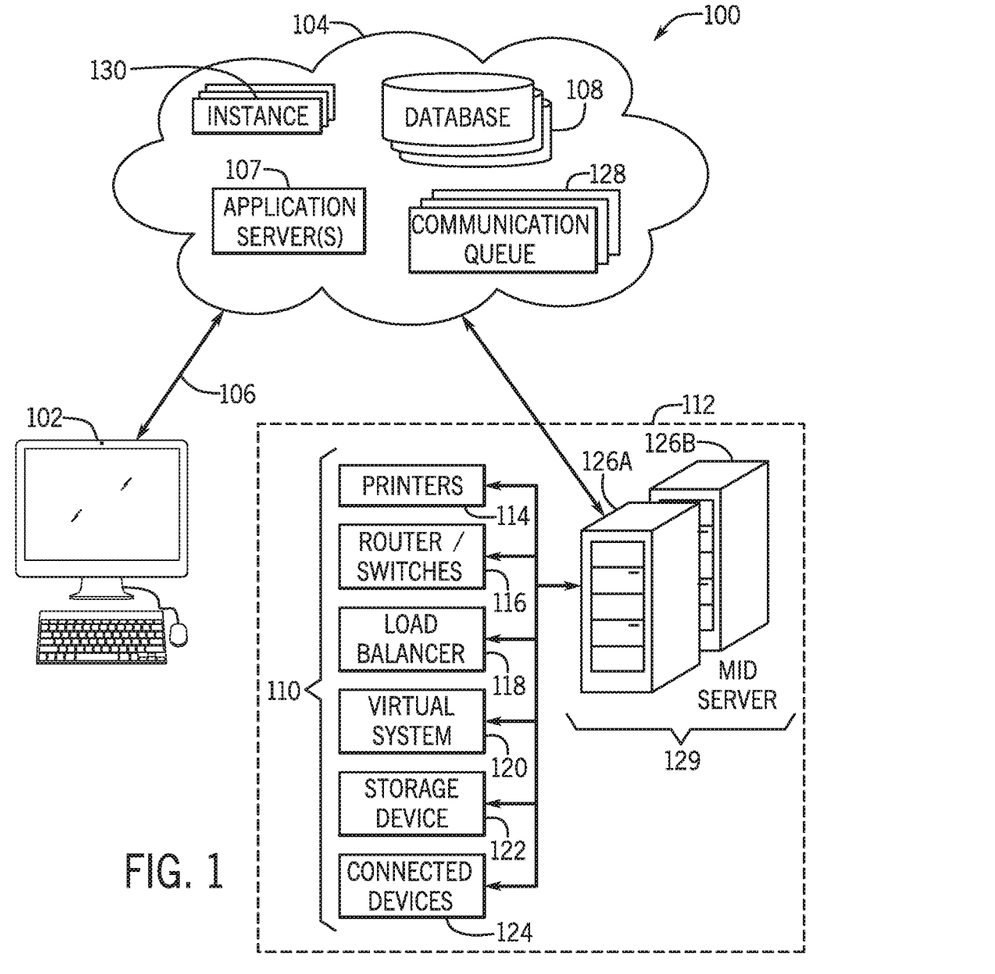
FIG. 1 is a block diagram of a generalized distributed computing system utilizing a cloud service platform, in accordance with an embodiment.

With the preceding mind, and to facilitate subsequent discussion of the present approach, certain generalized concepts related to distributed computing environments and devices that may be deployed in such environments (including devices to be monitored and devices capable of performing monitoring operations as discussed herein) will be initially provided. For example, FIG. 1 is a block diagram of a cloud-based computing platform system 100, which may perform one or more of the techniques described herein. As illustrated in FIG. 1, a client 102 communicates with a cloud service 104 over a communication channel 106. The client 102 may include any suitable computing system. For instance, the client 102 may include one or more computing devices, such as a mobile phone, a tablet computer, a laptop computer, a notebook computer, a desktop computer, or any other suitable computing device, or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The cloud service 104 may include any suitable number of computing devices (e.g., computers) in one or more locations that are connected together using one or more networks. For instance, the cloud service 104 may include various computers acting as servers in datacenters at one or more geographic locations where the computers communicate using network and/or Internet connections. The communication channel 106 may include any suitable communication mechanism for electronic communication between the client(s) 102 and the cloud service 104. The communication channel 106 may incorporate local area networks (LANs), wide area networks (WANs), virtual private networks (VPNs), cellular networks (e.g., long term evolution networks), and/or other network types for transferring data between the client 102 and the cloud service 104. For example, the communication channel 106 may include an Internet connection when the client 102 is not on a local network common with the cloud service 104. Additionally or alternatively, the communication channel 106 may include network connection sections when the client 102 and the cloud service 104 are on different networks or entirely using network connections when the client 102 and the cloud service 104 share a common network. Although only a single client 102 is shown connected to the cloud service 104, it should be noted that cloud service 104 may connect to multiple clients 102 (e.g., tens, hundreds, or thousands of clients).

Through the cloud service 104, the client(s) 102 may connect to various devices with various functionality, such as gateways, routers, load balancers, databases, application servers running application programs on one or more nodes, or other devices that may be accessed via the cloud service 104. For example, the client 102 may connect to an application server 107 and/or one or more databases 108 (e.g., a configuration management database (CMDB)) via the cloud service 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the cloud service 104. The application nodes may be implemented using processing threads, virtual machine instantiations, or other computing features of the application server 107. Moreover, the application nodes may store, evaluate, or retrieve data from the databases 108 and/or a database server.

The databases 108 may include a CMDB having a series of tables containing information about assets and enterprise services controlled by a client 102 and the configurations of these assets and services. The assets and services may include configuration items (CIs) 110 that may be computers, other devices on a network 112 (or group of networks), software contracts and/or licenses, or enterprise services. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In addition to the databases 108, the cloud service 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. The databases may be implemented and/or managed using any suitable implementations, such as a relational database management system (RDBMS), an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the cloud service 104 may have access to one or more databases external to the cloud service 104 entirely, such as at a client site. As discussed herein, some or all of the devices and CI's related in FIG. 1 may constitute monitored assets that may benefit from the present approach to event management.

In the depicted topology, access to the cloud service 104 is enabled via one or more management, instrumentation, and discovery (MID) servers 126 (e.g., MID servers 126A or 126B in the depicted example) via a communication queue 128. The MID server(s) 126 may include an application program (e.g., Java application) that runs as a service (e.g., Windows service or UNIX daemon) that facilitates communication and movement of data between the cloud service 104 and external applications, data sources, and/or services. The MID server(s) 126 service may be executed using a computing device (e.g., server or computer) on the network 112 that communicates with the cloud service 104. The MID server(s) 126 may periodically or intermittently use discovery probes to determine information on devices connected to the network 112 and return the probe results back to the cloud service 104. In the illustrated embodiment, the MID server(s) 126 are located inside the network 112, thereby alleviating the use of a firewall in communication between the CIs 110 and the MID server(s) 126. However, in some embodiments, a secure tunnel may be generated between a MID server 126 running in the cloud service 104 that communicates with a border gateway device of the network 112.

For large topologies, a vast amount of data (e.g., data regarding events) may be captured and processed by the MID server(s) 126. Accordingly, in some embodiments, multiple MID servers (e.g., 126A and 126B) may form a cluster 129. The cluster 129 may be used to process incoming data from the CIs 110. The MID servers 126 of the cluster 129 may communicate with each other over a communications protocol (e.g., Transmission Control Protocol (TCP)), enabling an assignment of CI 110 metric data processing to be communicated amongst the multiple MID servers 126 of the cluster 129.

In the depicted embodiment, metrics generated for the CIs 110 are provided to the MID server(s) 126 through an event management listener. As discussed herein, the metric data may be indicative of an event (e.g., incident) or may constitute an event message. As discussed herein, messages related to different incidents may be given a unique identifier (e.g., a message key) specific to a respective event. As will be discussed in more detail below, processing of event message for respective events may be limited to a respective MID server utilizing a subscription based model based on the message key. Accordingly, CI 110 metrics may be pulled by an event management listener that pushes the information to a cluster 129 of MID servers 126. Subsets of the metric data (e.g., corresponding to an event and corresponding message key) are received only by those MID servers of cluster 129 that are subscribed to the respective message key to process the subset of metric data. For example, the event management listener may send an event and corresponding message key to a publishing MID server. The publishing MID server may push the metric or event data to a message bus to which other MID servers communicate with. One of the other MID servers may in turn be subscribed to receive messages identified by the respective message key, and thereby receives the event message tagged with the respective message key. Correspondingly, a MID server not subscribed to the respective message key do not receive event message having that message key.

In one implementation, the event management listener is a REST (REpresentational State Transfer) listener server that facilitates communication of events and alerts to the MID server(s) 126. In one implementation, the REST listener server saves events, event rules, and alerts for communication to a database queue, such as a communication queue 128. The communication queue 128 may be a database table that is typically queried, updated, and inserted into by other systems. Each record in the communication queue 128 is a message from an Instance 130 in the cloud service 104 to a system (e.g., MID server(s) 126 external to the cloud service 104 that connects to the cloud service 104 or a specific Instance 130 running in the cloud service 104 or a message to the Instance 130 from the external system.) The fields of a communication queue 128 record include various data about the external system or the message in the record. Additionally, the communication queue 128 may serve as a message bus for events and message keys waiting to be processed. As discussed herein, after an event management listener pushes metric data (e.g., event and corresponding message key) to a MID server 126, the event and message key may be published on message bus communication queue 128. The message bus may then propagate the events and message keys to a subscribed MID server for processing.

Although the system 100 is described as having the application servers 107, the databases 108, the communication queue 128, the MID server(s) 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems (or computer systems in general) may communicate with the cloud service 104 in addition to the MID server(s) 126 may be used to implement the present approach.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the cloud service 104.

Figure 2:
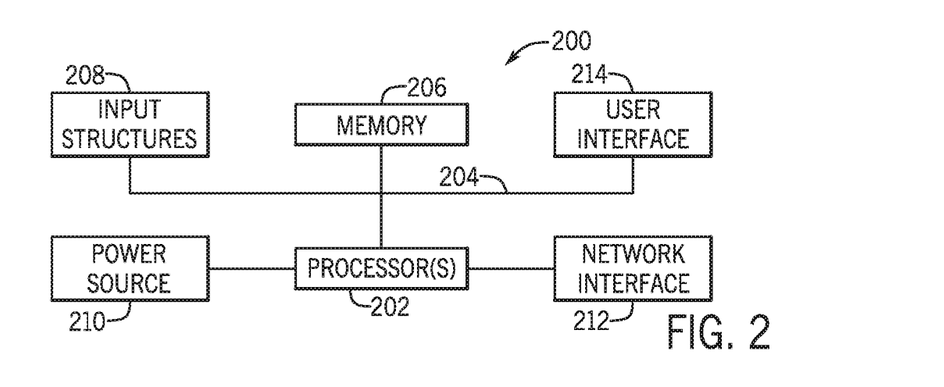
FIG. 2 is a block diagram of a computing device utilized in the distributed computing system of FIG. 1, in accordance with an embodiment.

In any case, to perform one or more of the operations described herein, the client 102, the application server 107, the MID servers 126 of cluster 129, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., database 108), other servers or processor-based hardware devices present in the cloud service 104, a device running the MID servers 126, and/or any of the CIs 110. As previously noted, these devices may include a computing system that includes multiple computing devices or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processors capable of executing instructions stored in the memory 206. For example, the one or more processors may include microprocessors, system on a chips (SoCs), or any other processors performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 may be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternatively or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202. As may be appreciated, such environmental, and positioning inputs may be part of the data monitored for a given computing device 200 for event management.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. In addition and/or alternative to the display, the user interface 214 may include other devices for interfacing with a user. For example, the user interface 214 may include lights (e.g., LEDs), speakers, and the like.

Figure 3:
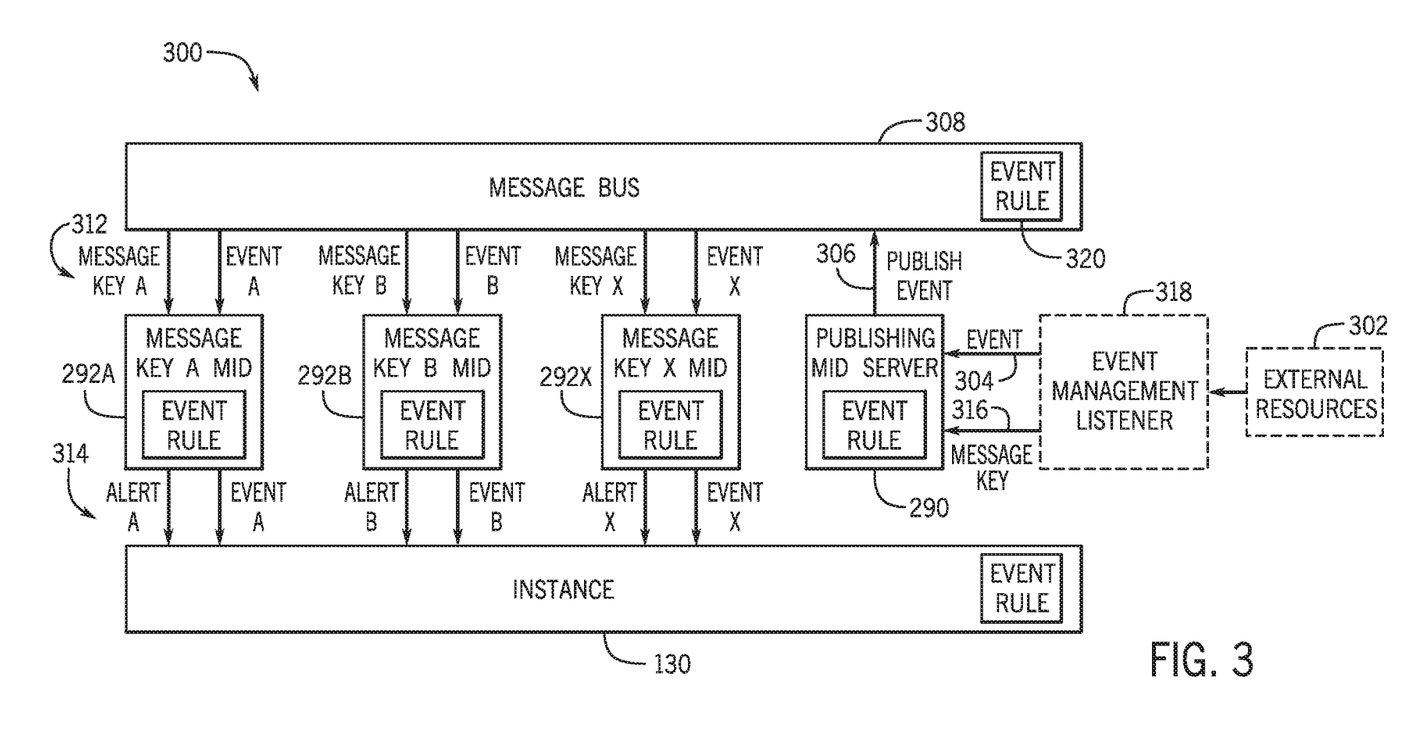
FIG. 3 is a block diagram of an event management system that is used to process events in accordance with an embodiment.

With the preceding in mind, FIG. 3 is a block diagram of one example of an event management system 300 using message keys as unique identifiers for events to preserve the order of events processed. In the depicted implementation the event management system 300 includes a publishing MID server 290 and subscribed or event processing MID servers 292 (e.g., event processing MID servers 292A, 292B, 292X, and so forth) to respectively publish and/or process events. The present components and arrangement are shown to simplify explanation by discretely separating the publishing and subscribing aspects. In practice, as may be appreciated, the MID server performing the publishing operation may also be a subscriber to certain events and process the subscribed events. Turning back to FIG. 3, the respective publishing and processing MID servers 290 and 292 are communicatively coupled to a message bus communication queue 308 and may be in communication with an Instance 130 as shown running in the cloud service 104 of FIG. 1.

External resources 302 (such as CI's or other monitored devices, applications, communication links and so forth) provide data, which may be monitored metrics for services, devices, and operations (e.g., the CIs 110 of FIG. 1) or quantitative or qualitative indicators derived from such metrics. Specifically, the monitored data or indicator derived from such data may indicate an event (e.g., incident) occurring in a monitored resource. In one embodiment, an event management listener 318 may identify an event 304 in one or more of the external resources 302 based on such data and may transmit a notification of the event 304 to the publishing MID server 290, enabling the publishing MID server 290 to receive an event 304 from external resources 302 to be published for processing. Thus, a MID server of a cluster 129 acts as a publishing MID server 290 with respect to a given event. Other MID servers (and possibly also the publishing MID server 290) are available as possible processing MID servers 292, with only one of the MID servers eventually being subscribed to process messages for a respective event.

A determination as to the relevant MID server of a MID server cluster 129 that may be assigned to publish and to process the event received may be determined using a load balancer 118, which balances the work amongst the MID servers of cluster 129. As previously mentioned, the processing MID servers 292 are assigned to process subsets of event messages received from the message bus 308 based on unique message keys specific to discrete event. In the depicted example, the MID server 292A is assigned to subscribe to message key A 312 so that it will only process messages related to event A (e.g., an event related to resource A, where resource A may be a computer). Because event messages are only processed by a single subscribing MID server, it is not possible for event messages to be processed out of sequence (i.e., out of order) due to different event messages being processed by different event processing servers.

As depicted in embodiment, the publishing MID server 290 publishes events 304 and corresponding message keys 316 based on event rules to a message bus 308. Event subscribed processing MID servers 292 (including potentially the MID server also acting as the publishing MID server) subscribed to particular message keys allow event messages for different events 304 to be balanced or spread between available subscribed processing MID servers 292, allowing the event message load to be load balanced. In the depicted example, processing an event 304 and message key 316 by a respective event processing MID server may correspond to the original event 304 and an alert 314 being provided to a respective Instance 130. As processing of the event messages is based on the unique message key 312, one alert 314 will be generated for a given event 304 by the respective processing MID server, as opposed to the possibility of multiple alerts 314 being generated if multiple processing servers had the potential to process event messages to the same event 304. The event 304 data may be stored in the Instance 130 for further analysis while the alert 314 may be acted upon to respond to the respective event 304, such as notifying service personnel or initiating an event 304 response. In one implementation, each of the MID servers in the event management system, including the publishing MID server 290 and processing MID servers 292, the message bus 308, and the Instance 130, are configured with the same event rule 320. The event rule 320 determines the manner in which event process alerts 314 are generated.

Although the following descriptions describe an event 304 as an incident for a resource, it should be noted that the an event 304 in event management systems and methods is a notification from a monitoring tool (e.g., event management listener) that indicates something of interest has occurred, such as a log message, warning, or error. In managing these incidents, the event management system and method generates alerts 314 for the reported event 304 and also stores the original event 304. As generally described above, the process flow to generate an alert 314 for a given incident includes an incident and message key 316 that goes through a publishing/subscription step and a processing step.

Figure 4:
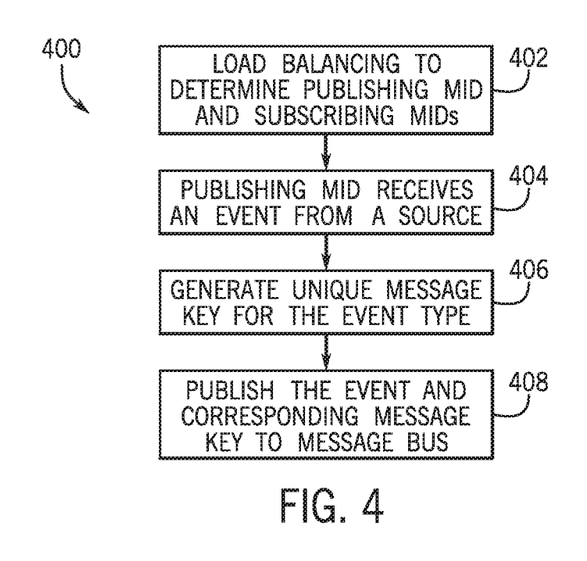
FIG. 4 is a flow chart of a process of publishing events onto a message bus, in accordance with an embodiment.

To help illustrate, an example of a process 400 of a publishing event of an incident in a resource is shown in FIG. 4. In the depicted example, the process 400 includes determining a publishing MID server and subscribing MID servers based on load balancing considerations (process block 402), determining the publishing MID server to receive an event message for a resource (process block 404), determining a unique message key for the respective event (process block 406), and publishing the event message and corresponding message key to a message bus (process block 408).

Thus, in some embodiments, the event management system may use a load balancer 118 to determine a MID server as a publishing MID server 290 and other MID servers (or the same MID server) as a subscribed processing MID server 292 (process block 402). The event management system architecture includes multiple MID servers configured with the same event alert rules and a load balancer 118 that may be used to automatically balance work between the MID servers. The load balancer 118 will automatically set a MID server of a cluster 129 as the publishing MID server 290 and will set a MID server of cluster 129 as a subscribed processing MID server 292 used for processing messages having the same message key. For the purposes of this example and following examples, the MID Server 290 is determined to be the publishing MID server and MID Server 292 of cluster 129 is determined to be the subscribed processing MID server 292, though it should be understood that each of the MID servers in the cluster 129 are configured with the same event rules 320 for publishing or processing and each of these MID servers may be used as the publishing MID server 290 or subscribed processing MID server(s) 292 in event management.

Once publishing MID server 290 and subscribed processing MID server 292 have been determined by load balancing, the notification of an event 304 sent from an event management listener 318 are received by the publishing MID server 290 (process block 404). In the current embodiment, the event management listener 318 is a REST (REpresentational State Transfer) listener server that communicates events, event rules, alerts, and so forth to the MID server(s) 126. The event management listener 318 (e.g., REST listener server) monitors and identifies issues across the external resources 302, and pushes an incident notification for a resource as an incident (e.g., events and alerts) to a database queue, such as a communication queue 128 to be published by the MID Server 290. An event 304 (e.g., incident) is a notification from one or more monitoring tools that indicates something of interest has occurred, such as a log message, warning, or error. As noted above, each of the MID servers in the event management system, including the publishing MID server 290 and processing MID servers 292, are configured with the same event rules 320. The event rules 320 determine the manner in which event process alerts are generated.

Figure 5:
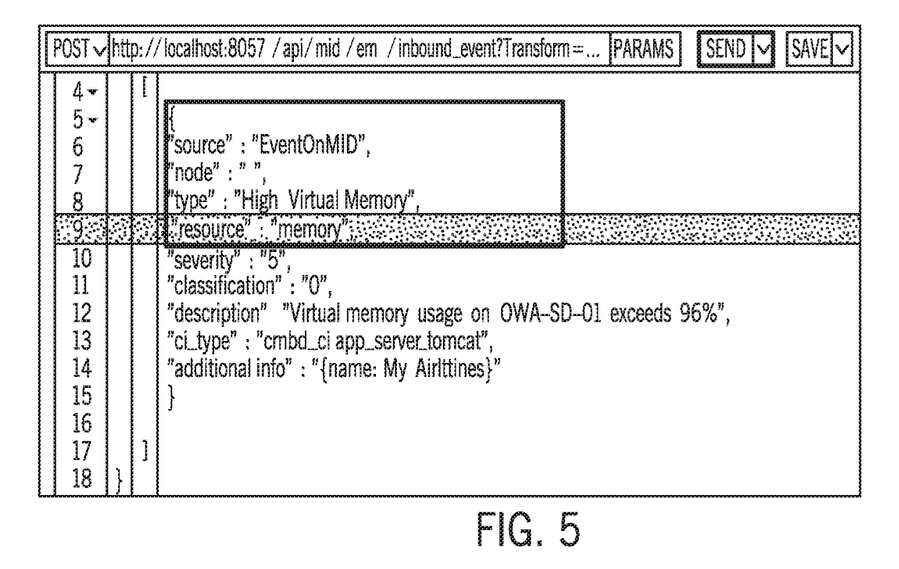
FIG. 5 is a diagram illustrating a graphical-user-interface (GUI) of field parameters to create the message key to be used in the process of publishing events, in accordance with an embodiment.

After the event 304 has been received, the publishing MID Server 290 sends the events through a publishing event 406 with an associated message key 316 generated by the event management listener 318 for event identification (process block 406). The message key 316 is used to associate and identify multiple event messages that relate to the same event 304 or incident. An example of a message key 316 using certain field parameters to uniquely identify an event 304 is illustrated in FIG. 5. The message key 316 uniquely identifies each event 304 by generating a key based on information that characterizes a given event 304 and which will not change during the life of the event 304. For example, in the depicted embodiment the message key 316 may be generated using some or all of: Source (e.g., "Event on MID"), Type (e.g., "High Virtual Memory"), Node, Resource ("Memory"), and Metric Name fields, and so forth. In one embodiment, the message key 316 may be a numeric value (e.g., from 0-99) calculated or generated based on designated event fields (e.g., node, resource, source, type, metric name, and so forth) so that similar message keys 316 will result in the same message key number. Thus, event messages generated at different times for the same event 304 will be given the same message key number and will therefore be processed by the same subscribed processing MID server 292. In one implementation, the message key number may be used to populate an event bucket field and used as the topic of the event message, allowing the subscribed processing MID server 292 to subscribe to this message key 316 and receive and process the related event messages in order of arrival. In this manner, there is no distribution of the event messages having the same message key 316 between parallel processing servers.

Figure 6:
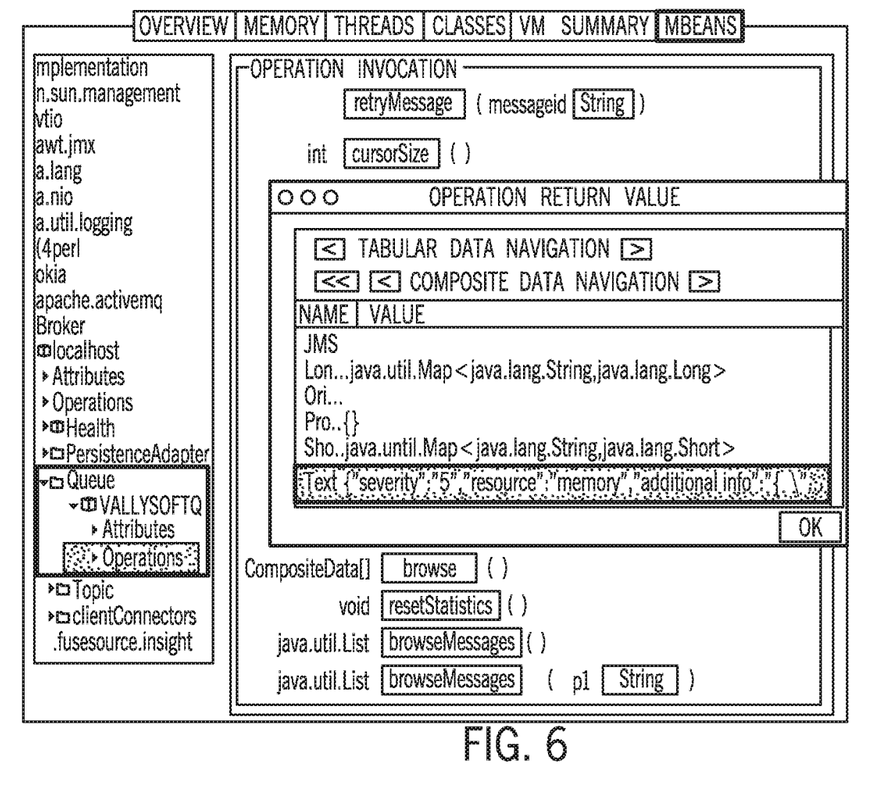
FIG. 6 is a diagram illustrating a GUI where an event is published on the message bus of FIG. 5, in accordance with an embodiment.

The incident and message key 316 pertaining to each incoming event received at the publishing MID server 290 is published to a message bus 308 (process block 408). As detailed in FIG. 6, once an event 304 is received by the publishing MID server 290 and the event is given a unique message key 316 as specified by a suitable set of field parameters (e.g., source, type, node, resource, and metric name), the event 304 and its message key 316 are published to the message bus 308 in queue to be processed. Each incoming event 304 from the external resources 302 is given a message key 316 by the event management listener 318 in the order each event is received, thus each message key 316 and event 304 is published to the message bus 308 in the same order as in a queue. Since incoming events 304 are published in the order that they are received, the message bus 308 will send the event 304 having a respective message key 316 to a processing MID server 292 subscribed to the respective message key 316 in the order the events 304 were generated, thereby preserving the order of events 304 when two events 304 may have the same associated message key 316. For example, if two incidents occur in the same resource (e.g., computer) and are assigned the same message key 316, both event messages will be processed by the same subscribed processing MID server 292 in the order the events 304 were generated.

Returning to the event management system of FIG. 3, once an event 304 has been published to the message bus 308 with a message key during the publish event 306, the event 304 and message key 316 may be processed by the corresponding subscribed processing MID server 292 and the processing event may generate an alert 314 based on the event rules 320. The alert 314 may in turn generate an appropriate response.

As noted above, once the event 304 and the message key 316 is sent to the subscribed processing MID server 292 for the specific message key 312 (e.g., for a message key A), the subscribed processing MID server 292 processes the event 304 and message key 312 to generate an alert 314. In the current embodiment, the processing MID servers of cluster 129 are all configured with the same event rules 320, which determine the manner in which events 304 are processed and alerts 314 are generated. Once a pre-configured event rule 320 is matched for an event 304, an alert 314 may be generated. An event rule 320 may transform information from events 304 to populate specified alert field values and/or compose alert fields from various values. Additionally, event rules 320 may be used to configure threshold rules that create or close alerts 314 with incoming matching events 304 that exceed specific thresholds. Essentially, the event rules 320 create alerts 314 for events 304 occurring in external resources 302 (e.g., alert 314 associated with a CI 110 and the alert 314 may show information about the CI that caused the event). Alternatively, the event rule 320 may also be configured to ignore extraneous events to prevent alert 314 generation and only send the event 304 to the Instance 130 for further analysis.

The alert 314 generated by the subscribed processing MID server 292 for a message key 316 is sent to the Instance 130 for remedial purposes or storing for future analysis. Processing events 304 on each subscribed processing MID server 292 in the order received from message bus 308 corresponds to processing and resolving events 304 in the order of incidents that occurred in a resource (e.g., external resources 302), thus alerts 314 and original event 304 are generated in order as well. Once the alert 314 is sent to the instance 130, the alert 314 is updated appropriately. The alert 314 may be managed by acknowledging the alert 314, creating a task such as an incident, problem, or change, or automatic remediation by starting a workflow. An alert 314 may be closed for a resolved event 304. Additionally, additional information, such as a knowledge article for future reference may be added to the alert 314 generated. Regardless of whether an alert 314 was generated by a processing MID server 292, the original event 304 is always available for review and remediation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for processing event alerts in a networked computer architecture, the method comprising:
   at an event management listener, generating a message key and event indication in response to a condition on a resource monitored by the event management listener;
   assigning a first management, instrumentation, and discovery (MID) server of a plurality of MID servers as a publishing MID server and a second MID server of the plurality of MID servers as a subscribed MID server;
   assigning the message key to the subscribed MID server to receive each event indication associated with the message key;
   at the publishing MID server, receiving the message key and the event indication and publishing the event indication and message key to a message bus;
   at the subscribed MID server, processing the event indication, wherein the subscribed MID server is subscribed to the message key so that other MID servers of the plurality of MID servers do not receive the event indication associated with the message key, and wherein processing the event indication comprises generating an alert based on a set of event rules; and
   providing the alert to an instance in communication with the subscribed MID server.

2. The method of claim 1, wherein the message key is generated as a numeric value determined by fields characterizing the event indication such that subsequent related event indications have the same message key.

3. The method of claim 2, wherein the subsequent related event indications having the same message key are processed in order by the subscribed MID server based on having the same message key.

4. The method of claim 1, wherein the event indication is provided to the instance in addition to the alert.

5. The method of claim 1, wherein the event indication is a notification that indicates a log message, warning, or error has occurred.

6. The method of claim 1, wherein the message key is used to populate an event bucket field associated with publishing the event indication.

7. The method of claim 6, wherein the event bucket field is part of a topic header of the publishing the event indication.

8. The method of claim 1, wherein event management listener generates the event indication based on metric data pulled from monitored resources.

9. The method of claim 1, wherein the message key is generated based on resource parameters comprising one or more of source, type, node, resource, or metric name field.

10. The method of claim 1, further comprising a load balancer that determines which MID server of the plurality of MID servers receives the message key and the event indication to publish.

11. A data center comprising:
    a plurality of shared memory devices configured to store instructions; and
    a plurality of processors configured to execute the instructions, wherein the instructions cause the plurality of processors to implement an event management listener, a load balancer, and a plurality of management, instrumentation, and discovery (MID) servers, wherein:
    the event management listener is configured to generate a message key and event indication in response to a condition on a resource monitored by the event management listener;
    the load balancer is configured to:
       assign a first MID server of the plurality of MID servers as publishing MID server and a second MID server of the plurality of MID servers as a subscribed MID server; and
       assign the message key to the subscribed MID server to receive each event indication associated with the message key; and
    the plurality of MID servers comprising:
       the publishing MID server, wherein the publishing MID server receives the message key and the event indication and publish the event indication and message key to a message bus; and
       the subscribed MID server, wherein the subscribed MID server process the event indication, wherein the subscribed MID server is subscribed to the message key so that other MID servers of the plurality of MID servers do not receive the event indication associated with the message key, and wherein processing the event indication comprises generating an alert based on a set of event rules.

12. The data center of claim 11, wherein the subscribed MID server is further configured to provide the alert to an instance in communication with the subscribed MID server.

13. The data center of claim 11, wherein the message key is generated as a numeric value determined by fields characterizing the event indication such that subsequent related event indications have the same message key.

14. The data center of claim 13, wherein the subsequent related events having the same message key are processed in order by the subscribed server based on having the same message key.

15. The data center of claim 11, wherein the event indication is provided to an instance in addition to the alert.

16. The data center of claim 11, wherein event management listener generates the event indication based on metric data pulled from monitored resources.

17. The data center of claim 11, wherein the load balancer determines which MID server receives of the plurality of MID servers the message key and the event indication to publish.

18. A method for processing event data, comprising:
    receiving monitored data from one or more connected resources at an event management listener, wherein the monitored data comprises one or more parameter fields;

in response to monitored data constituting an event, generating a message key for the event based on the one or more parameter fields such that the same message key is generated for subsequent monitored data related to the event;

assigning a first management, instrumentation, and discovery (MID) server of a plurality of MID servers as a publishing MID server and a second MID server of the plurality of MID servers as a subscribed MID server;

assigning the message key to the subscribed MID server to receive each event associated with the message key;

transmitting the event and message key to the publishing MID server in communication with the event management listener to be subsequently processed by the subscribed MID server.

19. The method of claim 18, wherein the monitored data comprises metric data related to an operation of the one or more connected resources.

20. The method of claim 18, wherein the message key is generated as a numeric value determined by fields characterizing an event indication for the event such that subsequent related event indications have the same message key.

* * * * *

UNITED STATES PATENT AND TRADEMARK OFFICE
CERTIFICATE OF CORRECTION

PATENT NO. : 10,659,289 B2  
APPLICATION NO. : 15/933115  
DATED : May 19, 2020  
INVENTOR(S) : Vadim Shif et al.

Page 1 of 1

It is certified that error appears in the above-identified patent and that said Letters Patent is hereby corrected as shown below:

In the Claims

Column 14, Claim 11, Line 34, replace "publish" with --publishes--; and
    Line 37, replace "process" with --processes--.

Column 14, Claim 14, Line 33, insert --MID-- between the words "subscribed" and "server".

Column 14, Claim 16, Line 57, insert --the-- between the words "wherein" and "event".

Column 14, Claim 17, Line 61, delete the word "receives"; and
    Line 62, insert the word --receives-- between the words "and" and "the".

Signed and Sealed this  
Twenty-second Day of December, 2020

Andrei Iancu  
*Director of the United States Patent and Trademark Office*